Patented Apr. 29, 1941

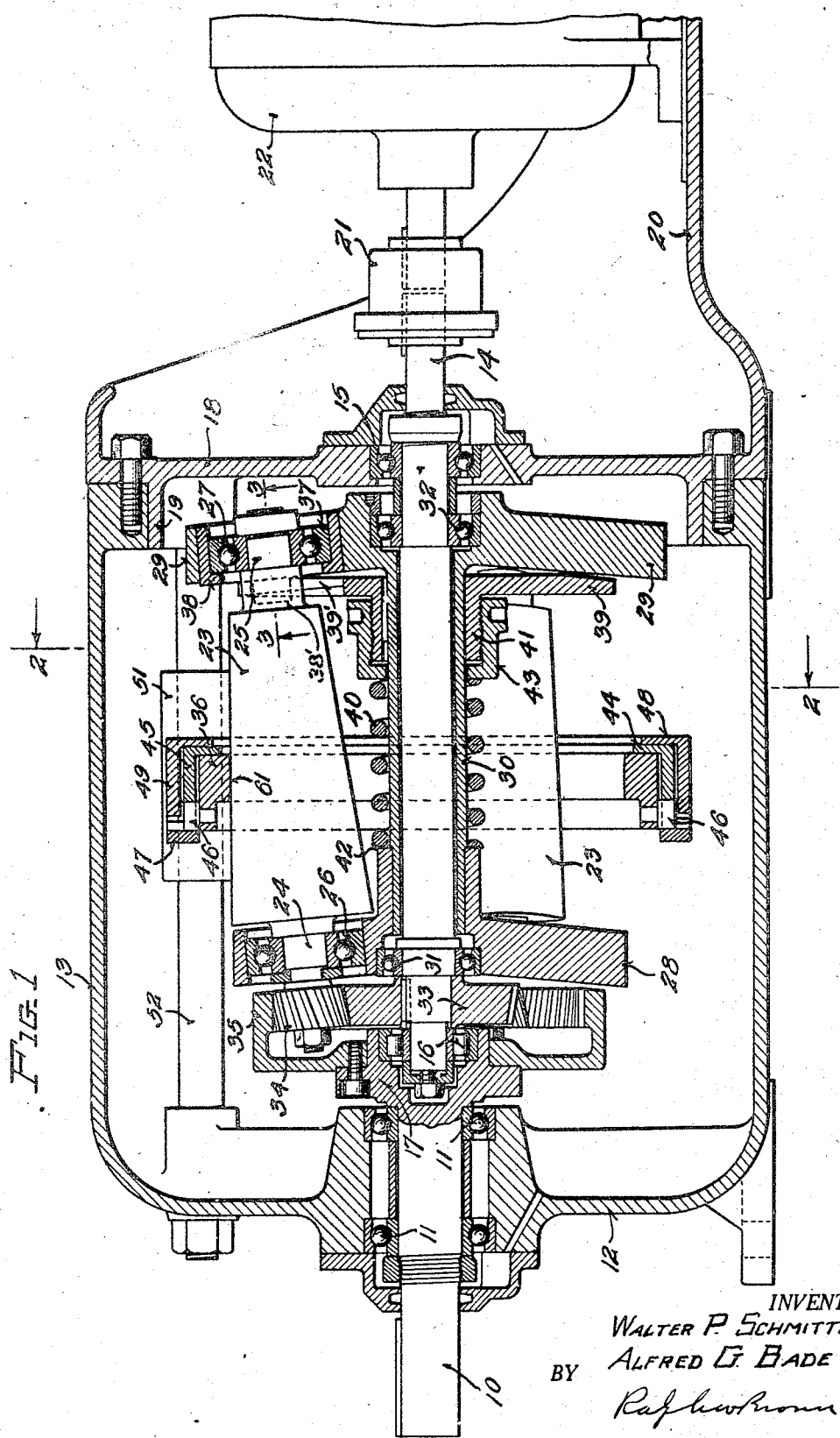

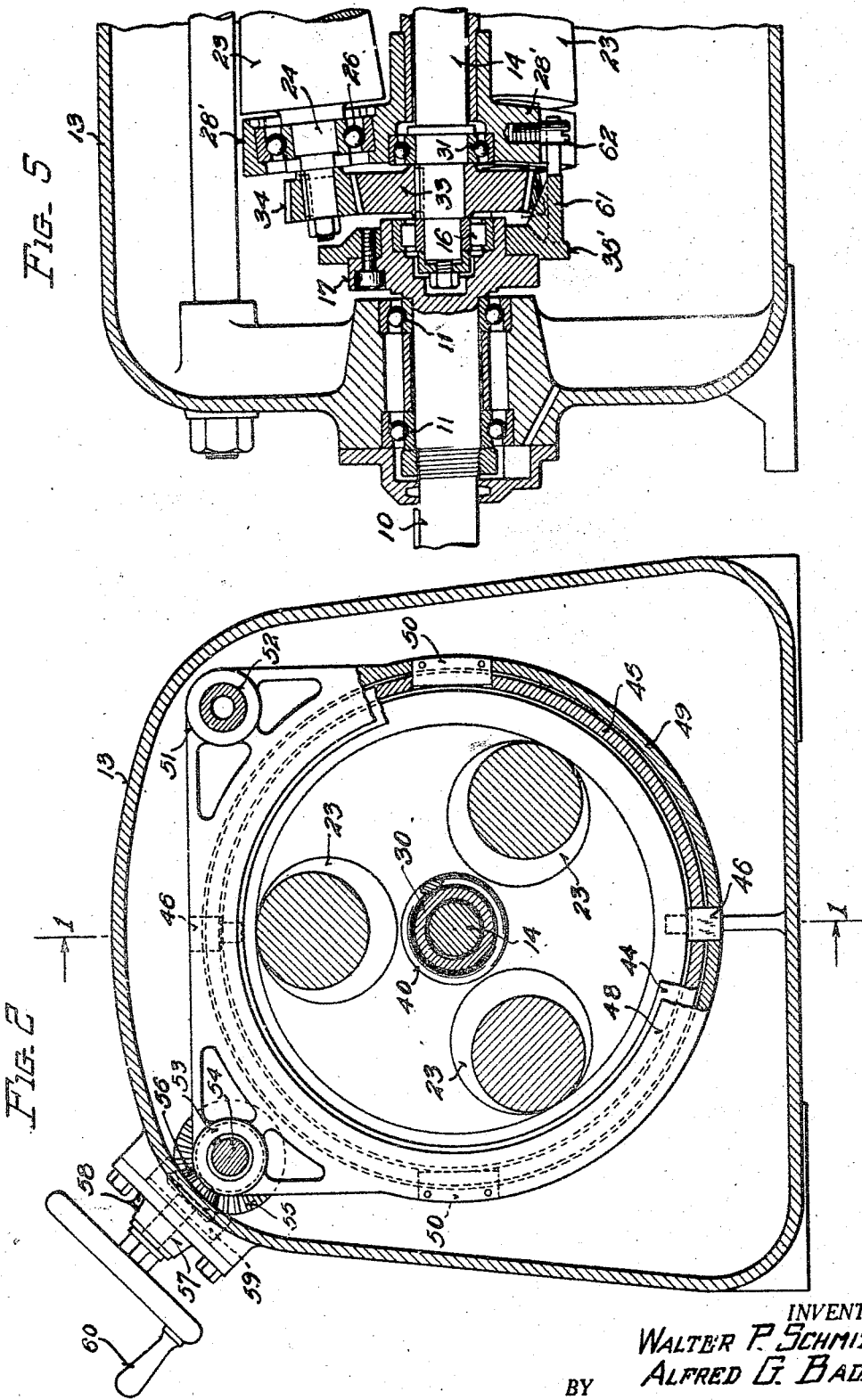

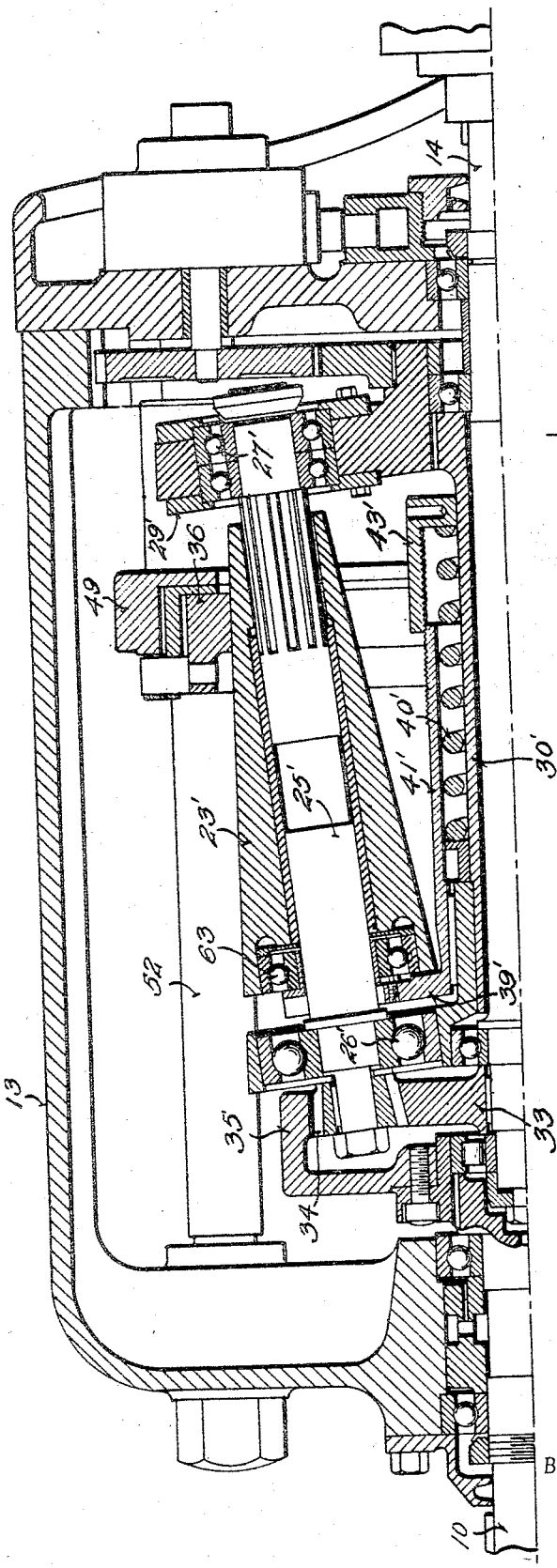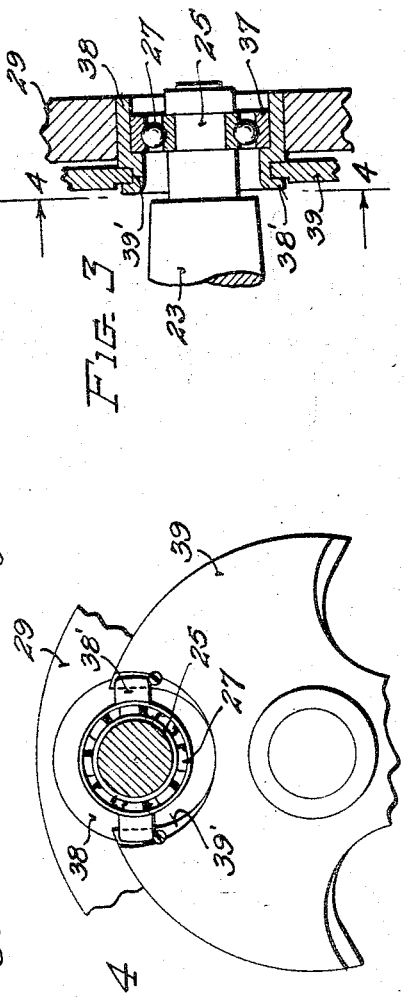

2,240,148

UNITED STATES PATENT OFFICE 2,240,148

VARIABLE SPEED TRANSMISSION

Walter P. Schmitter and Alfred G. Bade, Milwaukee, Wis., assignors to The Falk Corporation, Milwaukee, Wis., a corporation of Wisconsin Application November 29, 1935, Serial No. 52,095

31 Claims. (Cl. 74—281)

This invention relates to variable speed transmissions.

A general aim of the present invention is to provide an improved variable speed transmission of simple, compact, and rugged construction, which may be economically produced and maintained, and which will function efficiently and reliably to effect operation of the driven part at any of a multiplicity of speeds within a range preferably considerably below the speed of the driver.

In carrying out the invention, use is made of certain advantageous principles involved in a type of planetary transmission heretofore proposed but never utilized industrially because of serious practical objections and difficulties inherent in prior designs. The type of transmission referred to involves a plurality of longitudinally tapered planets driven by a sun and controlled in their planetary action by a ring adjustable in a manner to engage the planets at any of a plurality of points in the length thereof.

A more specific object of the invention is the provision of improved means for effecting the required contact pressures between the planets and ring so as to assure proper traction therebetween. This feature is of considerable importance in those instances where friction or adhesion between the contact surfaces is relied upon to effect transmission of the torque load.

Another object is to reduce the internal stresses in the mechanism by utilizing the centrifugal forces involved to assist in maintaining the contact pressures.

Another object is the provision of means for equalizing the contact pressures between the planets and ring. In accomplishing this, the ring is preferably mounted for universal radial movement so that it is free to center itself with respect to the planetary group. This feature is instrumental in causing each of the planets to assume a portion of the transmitted load.

A more specific object is to mount the planets in an improved manner so as to simplify the construction and provide for a freedom of action desirable for proper functioning.

Another specific object is to so combine and arrange the parts as to render the contact pressures between the planets and ring automatically variable in accordance with variations in the torque load.

Another object is to improve the gear action in planetary systems of this type by the use of gears of special tooth form.

Another object is the provision of improved control means for facilitating operation and control of the speed regulating ring.

Other objects and advantages will appear, expressed or implied, from the following description of three illustrative embodiments of the present invention.

In the accompanying drawings:

Figure 1 is a longitudinal sectional view of a variable speed planetary transmission constructed in accordance with the present invention. This view is taken substantially along the section line 1—1 of Fig. 2.

Fig. 2 is a transverse sectional view taken substantially along the line 2—2 of Fig. 1.

Fig. 3 is a sectional view taken along the section line 3—3 of Fig. 1.

Fig. 4 is a sectional view taken along the section line 4—4 of Fig. 3.

Fig. 5 is a fragmentary sectional view of a modified form of the invention.

Fig. 6 is a part sectional view of another modified form of the invention.

The transmission shown in Figs. 1 and 2 comprises a driven shaft 10, journalled in spaced bearings 11 in the forward end 12 of an appropriate housing 13, and an aligned drive shaft 14, journalled in a bearing 15 in the rear end of the housing and in a bearing 16 in a hollow head 17 formed on the inner end of the driven shaft.

In this instance the housing 13 is permanently closed at its forward end 12, and at its rear end it is closed by a removable end plate 18 having a circular flange 19 snugly fitted in a circular end opening in the housing so as to accurately center the plate with respect to the housing. The plate 18 supports the bearing 15 and carries a motor supporting bracket 20 formed integral therewith.

The shaft 14 is driven through a flexible coupling 21 of a well known type from a standard electric motor 22 mounted on the bracket 20.

The transmission shown also includes a plurality of inclined longitudinally tapered rollers 23 mounted to travel in planetary fashion about the axis of the shaft 14. In this instance three such rollers 23 are employed, each supported by a pair of concentric end trunnions 24 and 25, journalled in bearings 26 and 27, respectively, in the end spiders 28 and 29 of an appropriate rotary carrier. The end spiders 28 and 29 are rigidly connected by a tubular supporting structure 30 which is journalled in spaced bearings 31 and 32 on the shaft 14.

The several rollers 23 are of uniform size and shape and are arranged with their axes uniformly inclined relative to the axis of the shaft 14 at an angle equal to the angle of their taper and with their smaller ends outermost, so that the outer extremities of the rollers are parallel to the shaft 14.

The several rollers 23 are driven from the shaft 14 through a sun gear 33 fixed to the shaft and engaged with planet gears 34 respectively fixed to the individual roller trunnions 24; and the shaft 10 is driven from the planet gears 34 through an internal gear 35 engaged therewith and fixed to the head 17 on the shaft 10. The planetary action of the rollers 23 and gears 34 is controlled by an appropriate non-rotary contact ring 36 preferably mounted and controlled in a manner to be later described.

In the transmission shown, each roller assembly, including a roller 23, its bearings 26 and 27 and its gear 34, is longitudinally movable in the direction of its inclined axis, and is continuously urged outwardly along that axis in a direction to maintain contact between it and the ring 36. For this purpose the outer race ring 37 of the bearing 27 of each roller is seated in a flanged bushing 38 slidably mounted in the spider 29, and a disk 39, axially movable along the tubular structure 30 of the carrier and slotted to accommodate the ends of the rollers 23, is urged against the flanged ends of the several bushings 38 by a compression spring 40.

In this instance the disk 39 is mounted on a sleeve 41, keyed or otherwise slidably connected with the tubular structure 30; and the spring 40 is confined between a shoulder 42 on the tubular structure 30 and a nut 43 threaded upon the sleeve 41, the nut being adjustable to regulate the spring pressure. The thrust of the spring 40, transmitted to the several rollers 23 through the spider 39, thus determines the minimum contact pressures maintained between the rollers 23 and the ring 36.

Provision is also preferably made for securing the three rollers 23 against longitudinal movement relative to each other so as to maintain the same properly correlated at all times. In the device shown, this is accomplished by the provision of a pair of hook-shaped lugs 38' which project from each of the bushings 38 through the slotted disk 39 and interlock with the latter, as indicated in Figs. 1, 3, and 4. It will be noted that each slot 39' in the disk 39 is too narrow to permit withdrawal of the lugs 38' therefrom when in the position shown in Fig. 4, but the depth of each slot 39' is sufficient to permit such withdrawal when the lugs 38' and their supporting bushing 38 are turned through an angle of ninety degrees from the position shown, thereby facilitating assembly and dismantling of the parts mentioned. It will also be noted that the side edges of each slot 39' are reduced so as to provide inclined faces 39'' parallel to the inclined end face of the bushing 38.

During operation of the transmission the contact pressures between the rollers 23 and ring 36, established by the spring 40 and disk 39 in the manner above described, are augmented by the centrifugal forces set up by the rollers in their circular travel about the shaft 14, the rollers being made large and heavy for this purpose. These forces of course vary in accordance with the speed of the carrier spiders 28 and 29.

Provision is also preferably made for further increasing these contact pressures between the rollers 23 and ring 36 in accordance with the torque load imposed on the transmission. For this purpose the intermeshing gears 33, 34, and 35 are of the single helical type, the spiral angle of the teeth being such that their reaction imposes an axial thrust on the gears 34 and rollers 23 in a direction to force the rollers along their outwardly inclined axes and against the ring 36. This thrust is of course proportional to the torque load on the gears.

In order to equalize the contact pressures between the ring 36 and the several rollers 23 the ring 36 is preferably floatably mounted in a manner to permit it to automatically center itself with respect to the roller group. In this instance the ring 36 is seated against an inwardly directed flange 44 of an encircling non-rotary ring 45, and engaged with the ring 45 through diametrically disposed blocks 46 swiveled in the ring 36 and slidably engaged in peripheral slots in the ring 45. The blocks 46 are retained in the ring 45 by plates 47 attached to the periphery of the ring. The ring 45 is similarly seated against an inwardly directed flange 48 of an encircling non-rotary carrier ring 49, and slidably supported on diametrically disposed keys 50 fixed to the ring 48 and projecting into peripheral slots formed in the ring 45. The ring 36 is thus shiftable within the ring 45 along a diameter aligned with the blocks 46, and also shiftable with the ring 45 along a diameter aligned with the keys 50 and at right angles to first named diameter. The ring 36 is thus permitted free radial movement within the carrier ring 49.

Provision is made for adjusting the ring 36 lengthwise of the rollers 23 so as to regulate the planetary action of the rollers. For this purpose the carrier ring 49 is provided at its outer periphery with an integral sleeve 51 slidably fitted on a supporting bar 52 which extends lengthwise of and preferably in the upper portion of the housing 13. The ring 49 is also provided at its periphery with an ear 53 bored and tapped to receive a screw shaft 54 disposed parallel to the bar 52. The shaft 54 is journalled in the ends 12 and 18 of the housing and carries a bevel gear 55 fixed thereto.

In this instance the control shaft 57 is journalled in a plate 58 removably attached to the top of the housing 13 and serving as a closure for an inspection hole 59. The shaft 57 is provided at its exposed end with an appropriate handle 60.

It is of course understood that by manipulation of the handle 60 the screw shaft 54 may be operated to shift the carrier ring 49 along the bar 52 and thereby shift the ring 36 into contact with the rollers 23 at various points in the length thereof. This changes the planetary action of the rollers 23 and the gears 34 and consequently changes the rate of rotation of the gear 35 and driven shaft 10.

It will also be understood that the sleeve 51 coacts with the bar 52 to normally retain the rings 49, 45 and 36 in a plane normal to the axis of the planetary system. However, during adjustment, the carrier ring 49 yields slightly under the thrust of the screw shaft 54 so as to cant the ring 36 slightly with respect to the rollers 23, and when thus canted the reaction between the operating rollers and the ring 36 is such as to urge the ring in the direction of the thrust. Due to this peculiar reaction, little effort is required to thus shift the ring 36 in spite of the heavy contact pressures between it and the rollers.

The internal contact surface 61 of the ring 36 may be of symmetrical or unsymmetrical form, but is preferably slightly convex and I have found that best results are attainable when the radius of transverse curvature is considerably greater than the diameter of the ring.

Because of the angular relation between the axes of the planetary gears 34 relative to the axis of the sun gear 33 and orbit gear 35, gears of special tooth form are required for smooth and efficient gear action. In this instance the teeth of the orbit gear 35 are of standard helical form. The teeth of the other gears 33 and 34 differ from standard helical gears in that they are slightly tapered longitudinally, and are cut by a generating process like that employed in cutting helical gears except that during the cutting process the axis of the gear blank is disposed at an angle to the generating plane rather than parallel to it.

It will be noted that in the device shown, the planet gears 34 are axially tapered in the same direction and to the same degree as the taper of the rollers 23, thus permitting the use of an internal gear 35 of standard form, the sun gear 33 being axially tapered in the opposite direction at an angle twice as great as the taper of the gears 34 and rollers 23.

It will be noted that by mounting the shaft 14 and rollers 23 in the manner above described, they and their supports are withdrawable, as an assembled unit, from the housing 13 upon withdrawal of the end plate 18 from the housing, and that, when thus withdrawn, the contact ring 36 may be readily removed when replacement becomes necessary.

The transmission partially shown in Fig. 3 is identical with that shown in Figs. 1 and 2 except that the driven shaft 10 is connected to the carrier for the rollers 23 so as to rotate in unison with the carrier. Such an arrangement is employed in those instances where it is desired to operate the shaft 10 at a higher speed and where only a rather limited range of speed is necessary.

In this instance the gear on the driven shaft 10 has been replaced by a ring 35' having three integral arms 61 which project into driving engagement with a roller carrying spider 28' intermediate the several roller supporting bearings 26. Each of the arms 61 is slotted to receive a stud 62 fixed to the spider 28' through which the ring 35' and shaft 10 are driven from the spider.

The device illustrated in Fig. 6 is similar in many respects to that shown in Fig. 1 in that three inclined planetary rollers 23', supported by the rotary carrier 29', contact with an axially adjustable control ring 36 encircling the same. In this instance, however, the rollers are splined on individual supporting shafts 25' for adjustment lengthwise thereof, the shafts 25' being held against axial movement in bearings 26' and 27' in the carrier. Each shaft 25' carries a planetary pinion 34 driven by a sun gear 33 and meshing with the internal driven gear 35 carried by the driven shaft 10.

The several rollers 23' are urged along their outwardly inclined shafts by a disk 39', whose thrust is transmitted to each of the rollers through a ball bearing 63. A spring 40' acting on a nut 43', which is engaged with a sleeve 41' connected to the disk 39', urges the disk 39' toward the rollers.

We claim:

1. In a variable speed transmission the combination of a plurality of rotary planet members, a rotary carrier therefor, driving means therefor, encircling means engaged with said members, means for shifting said encircling means along said members to regulate their motion, driven means responsive to the motion of said members, and means for urging said members into forcible contact with said encircling means, said encircling means being radially movable to substantially equalize the contact pressures.

2. In a variable speed transmission the combination of a rotary carrier, a plurality of planet members therein rotatable about axes inclined to the axis of said carrier, driving means therefor, a rigid floating ring engaged with said members, means for shifting said ring along said members to regulate their motion, and driven means responsive to the motion of said members.

3. In a variable speed transmission the combination of a rotary carrier, a plurality of longitudinally tapered rollers rotatable therein about axes inclined to the axis of rotation of said carrier, driving means therefor, a rigid floating ring frictionally engaged with said members, means for shifting said ring along said rollers to regulate their motion, and driven means responsive to the motion of said members.

4. In a variable speed transmission the combination of a sun gear, a plurality of planet gears engaged therewith, a driven ring gear engaged with said planet gears, and means for regulating the motion of said planet gears comprising a plurality of tapered rollers each connected for rotation with one of said planet gears, a rotary carrier for said rollers, and an encircling floating rigid ring engaged with and movable longitudinally of said rollers.

5. In a variable speed transmission the combination of a plurality of longitudinally tapered relatively inclined planet rollers, a carrier therefor, driving means therefor, individual end supports for said rollers movable therewith in the direction of their respective axes, a contact ring encircling said rollers and movable lengthwise thereof to regulate their planetary action, resilient means for urging said rollers and their supports along said axes in a direction to maintain contact pressures between said rollers and ring, and driven means responsive to the action of said rollers.

6. In a variable speed transmission the combination of a rotary carrier, a plurality of longitudinally tapered relatively inclined planet rollers, individual end supports for said rollers journalled in said carrier and longitudinally movable with said rollers in the direction of their respective axes, means for driving said rollers, a contact ring encircling said rollers and movable lengthwise thereof to regulate their planetary action, driven means responsive to the motion of said rollers, and means for urging said rollers and their supports along their axes in a direction to maintain contact pressures between said rollers and ring.

7. In a variable speed transmission the combination of a plurality of longitudinally tapered relatively inclined planet rollers, a carrier therefor, driving means therefor, a contact ring encircling said rollers and movable lengthwise thereof to regulate their planetary action, driven means responsive to the action of said rollers, individual end supports for said rollers movable therewith in the direction of their respective axes, means for urging said rollers and their supports in a direction to maintain said rollers in contact with said ring, and means for floatably supporting said ring to equalize the contact pressures between said rollers and ring.

8. In a variable speed transmission the combination of a plurality of longitudinally tapered relatively inclined planet rollers, a carrier therefor, driving means therefor, driven means responsive to the action of said rollers, a contact ring encircling said rollers and movable lengthwise thereof to regulate their planetary action, means for urging said rollers against said ring, said rollers being further urged by centrifugal force against said ring to increase the contact pressures therebetween, and torque responsive means for further increasing the contact pressures between the rollers and ring.

9. In a variable speed transmission the combination of a plurality of longitudinally tapered relatively inclined planet rollers, a carrier therefor, driving means therefor, driven means responsive to the action of said rollers, a non-rotating non-contractable contact ring encircling said rollers and movable lengthwise thereof to regulate their planetary action, said rollers being movable into pressure contact with said ring, and means responsive to the torque load on the transmission for increasing the contact pressures between said rollers and ring.

10. In a variable speed transmission the combination of a plurality of longitudinally tapered relatively inclined planet rollers, a carrier therefor, a contact ring encircling said rollers and movable lengthwise thereof to regulate their planetary action, a driving helical gear, individual driving helical gears for said rollers engaged with said first named gear and reacting thereagainst to increase the contact pressures between said rollers and ring, and driven means responsive to the action of said rollers.

11. In a variable speed transmission the combination of a plurality of longitudinally tapered relatively inclined planet rollers, a carrier therefor, a contact ring encircling said rollers and movable lengthwise thereof to regulate their planetary action, driving means for said rollers, a driven helical gear, and helical gears between said driven gear and rollers reacting on said rollers to increase the contact pressures between said rollers and ring.

12. In a variable speed transmission the combination of a plurality of longitudinally tapered relatively inclined planet rollers, a carrier therefor, a contact ring encircling said rollers and movable lengthwise thereof to regulate their planetary action, a plurality of helical gears individually fixed to said rollers to move therewith, a helical driving gear engaged with said first named gears, and a helical driven gear engaged with said engaged gears, said first named gears reacting on one another to force said rollers against said ring and thereby increase the contact pressures between said rollers and ring.

13. In a variable speed transmission the combination of a helical sun gear, a plurality of helical planet gears engaged therewith, a helical ring gear engaged with said planet gears, a longitudinally tapered roller fixed to each of said planet gears, a carrier for said rollers and planet gears and a contact ring encircling said rollers and movable lengthwise thereof to regulate their planetary action, each of said rollers and its connected planet gear being rotatable about and shiftable along an axis inclined to the axis of said sun gear.

14. In a variable speed transmission the combination of a helical sun gear, a plurality of helical planet gears engaged therewith, a helical ring gear engaged with said planet gears, a longitudinally tapered roller fixed to each of said planet gears, a carrier for said rollers and planet gears, and a floating contact ring encircling said rollers and movable lengthwise thereof to regulate their planetary action, each of said rollers and its connected planet gear being rotatable about and shiftable along an axis inclined to the axis of said sun gear.

15. In a variable speed transmission the combination of a plurality of longitudinally tapered relatively inclined planet rollers, a support therefor permitting the same to shift along their inclined axes, a helical planet gear fixed to each of said rollers and shiftable therewith, a helical sun gear axially tapered in one direction and engaged with said planet gears, a helical ring gear engaged with said planet gears, said planet gears being axially tapered in the opposite direction, and a control ring contacting said rollers and movable lengthwise thereof to regulate their planetary action.

16. In a variable speed transmission the combination of a rotary carrier, a plurality of longitudinally tapered relatively inclined planet rollers in said carrier each shiftable along its longitudinal axis, a contact ring encircling said rollers and movable lengthwise thereof to regulate their planetary action, a helical planet gear fixed to each of said rollers and axially shiftable therewith, each of said gears being axially tapered in the same direction as the taper of its connected roller, a helical sun gear engaged with said planet gears and axially tapered in the opposite direction, and driven means responsive to the action of said rollers.

17. In a variable speed transmission the combination of a rotary carrier, a plurality of shafts in said carrier inclined to the axis of rotation thereof, a longitudinally tapered planet member longitudinally movable on each of said shafts, encircling means engaged with said members and movable longitudinally thereof to regulate their motion, driven means responsive to the motion of said members, and means for urging said members along said shafts into forcible contact with said encircling means.

18. In a variable speed transmission the combination of a plurality of longitudinally tapered planet members rotatable about non-parallel axes, a carrier therefor, driving means therefor, encircling means engaged with said members and movable longitudinally thereof to regulate their motion, driven means responsive to the motion of said members, said members being longitudinally movable into forcible contact with said encircling means, and means for securing said rollers against longitudinal movement relative to each other.

19. In a variable speed transmission the combination of a plurality of longitudinally tapered planet members rotatable about non-parallel axes, a carrier therefor, driving means therefor, encircling means engaged with said members and movable longitudinally thereof to regulate their motion, driven means responsive to the motion of said members, spring urged means for forcing said members longitudinally against said encircling means, and means for securing said members against longitudinal movement relative to each other.

20. A variable speed transmission including a rotary carrier, a plurality of conical planetary rollers supported for rotation with and with respect to the carrier and correspondingly inclined with respect to the axis of rotation of the carrier, a non-rotatable, non-resilient member encircling said rollers, means mounting said member whereby it may be translated both axially and radially with respect to said axis, means for moving said member axially over substantially the length of the rollers, and a prestressed resilient device incorporated in said transmission causing relative translatory movement between said member and rollers.

21. A variable speed transmission including a rotary carrier, a plurality of conical friction rollers supported for rotation with and with respect to the carrier and correspondingly inclined with respect to the axis of rotation of the carrier, a non-rotatable, non-resilient friction ring encircling said rollers, means for supporting the ring for free radial movement and for moving the ring axially of the rollers over substantially the length of the rollers to control their motion, and a resilient pre-stressed instrumentality acting on said rollers to develop a working pressure between said rollers and said ring.

22. A variable speed transmission comprising a rotary carrier, a plurality of conical frictional rollers supported for rotation with and with respect to the carrier and correspondingly inclined with respect to the axis of rotation of the carrier, a non-rotatable, non-resilient friction ring encircling said rollers, means for moving said ring axially of the rollers substantially the length of the rollers to control their motion, means mounting said ring for freely floatable radial movement, and a spring arrangement associated with the ring and rollers but separate from the ring, effective to develop a working pressure between said rollers and said ring, the freedom of the ring to move radially combined with the action of the spring arrangement dividing the working pressure developed among the rollers.

23. A variable speed transmission comprising a rotary carrier, a plurality of longitudinally tapered relatively inclined planet rollers, means supporting said rollers for rotation with and with respect to the carrier and also for axial outward movement with relation thereto, a non-rotatable, non-resilient friction ring encircling said rollers, means to move said ring axially of said rollers over substantially the length of the rollers to control their motion and to provide for free movement of the ring in a plane perpendicular to the axis of the carrier, said rollers being relatively large and heavy and adapted to be urged outwardly along their axes and into engagement with the ring under the influence of centrifugal force, said ring by virtue of its being held against rotation but being freely movable in the plane perpendicular to the axis of the carrier, tending to cause roller sections of the same diameter and of the same linear velocity to engage the ring.

24. A variable speed transmission including a rotary carrier, a plurality of conical planet rollers supported for rotation with and with respect to the carrier and correspondingly inclined with respect to the axis of rotation of the carrier, a non-rotatable, non-resilient member encircling said rollers, means mounting said member whereby it may be translated both axially and radially with respect to said axis, means for moving said member axially over substantially the length of the rollers, and a separate prestressed spring supported about the central axis of the carrier and associated with the rollers to develop a working pressure between the rollers and the ring, the freedom of the member for radial movement permitting division of the working pressure among the rollers.

25. A variable speed transmission including a rotary carrier, a plurality of conical planet rollers supported for rotation with and with respect to the carrier and correspondingly inclined with respect to the axis of rotation of the carrier, a non-rotatable, non-resilient member encircling said rollers, means mounting said member whereby it may be translated both axially and radially with respect to said axis, means for moving said member axially over substantially the length of the rollers, and a separate prestressed spring supported about the central axis of the carrier, and a spider engaged with the spring and interconnected with the rollers to cause the rollers to move outwardly along their axes and into working engagement with the ring, the freedom of the ring for radial movement permitting division of the working pressure among the rollers.

26. In a variable speed transmission the combination of a plurality of longitudinally tapered relatively inclined planet rollers, a support therefor permitting the same to shift along their inclined axes, a helical planet gear fixed to each of said rollers and shiftable therewith, a helical sun gear engaged with said planet gears, a helical ring gear engaged with said planet gears, said planet gears being axially tapered in one direction and said sun gear being axially tapered in the opposite direction, and a control ring contacting said rollers and movable lengthwise thereof to regulate their planetary action.

27. A variable speed transmission including a rotary carrier, a plurality of conical planetary rollers supported for rotation with and with respect to the carrier and correspondingly inclined with respect to the axis of rotation of the carrier, a non-rotatable, non-resilient member encircling said rollers, means mounting said member whereby it may be translated both axially and radially with respect to said axis, means for moving said member axially over substantially the length of the rollers, individual end supports for said rollers slidably mounted on said carrier and movable with said rollers in the direction of their respective axes, and a pre-stressed resilient device incorporated in said transmission causing relative translatory movement between said member and roller.

28. A variable speed transmission comprising a plurality of longitudinally tapered relatively inclined planet rollers, means supporting said rollers for rotary movement and for movement outwardly along their longitudinal axes, driving means for the rollers, a traction ring encircling the rollers and movable lengthwise thereof to regulate their planetary action, said rollers being urged outwardly along their axes into contact with said ring, a spider positively interconnected with said rollers to constrain them to corresponding longitudinal movement in either direction, and driven means responsive to the action of said rollers.

29. A variable speed transmission comprising a plurality of longitudinally tapered relatively inclined planet rollers, a rotary carrier on which the rollers are supported for rotation and for longitudinal movement outwardly along their axes, a traction ring encircling the rollers and controlling their planetary action, said rollers being urged outwardly along their axes into pressure contact with said traction ring, and means interconnecting the rollers to constrain them to corresponding longitudinal movement.

30. A variable speed transmission comprising a non-rotating ring, a planet member having an axially tapered section moveable into contact with said ring, torque responsive means for varying the contact pressure between said section and ring, and means for effecting relative movement between said section and ring to vary the speed ratio of the transmission.

31. A variable speed transmission comprising a non-rotating ring, a rotor, a plurality of planet members rotatable with and with respect to said rotor, each of said members having an axially tapered section moveable into contact with said ring, torque responsive means for varying the contact pressure between said sections and ring, and means for effecting relative movement between said sections and ring to vary the speed ratio of the transmission.

WALTER P. SCHMITTER.
ALFRED G. BADE.